Figure 6:
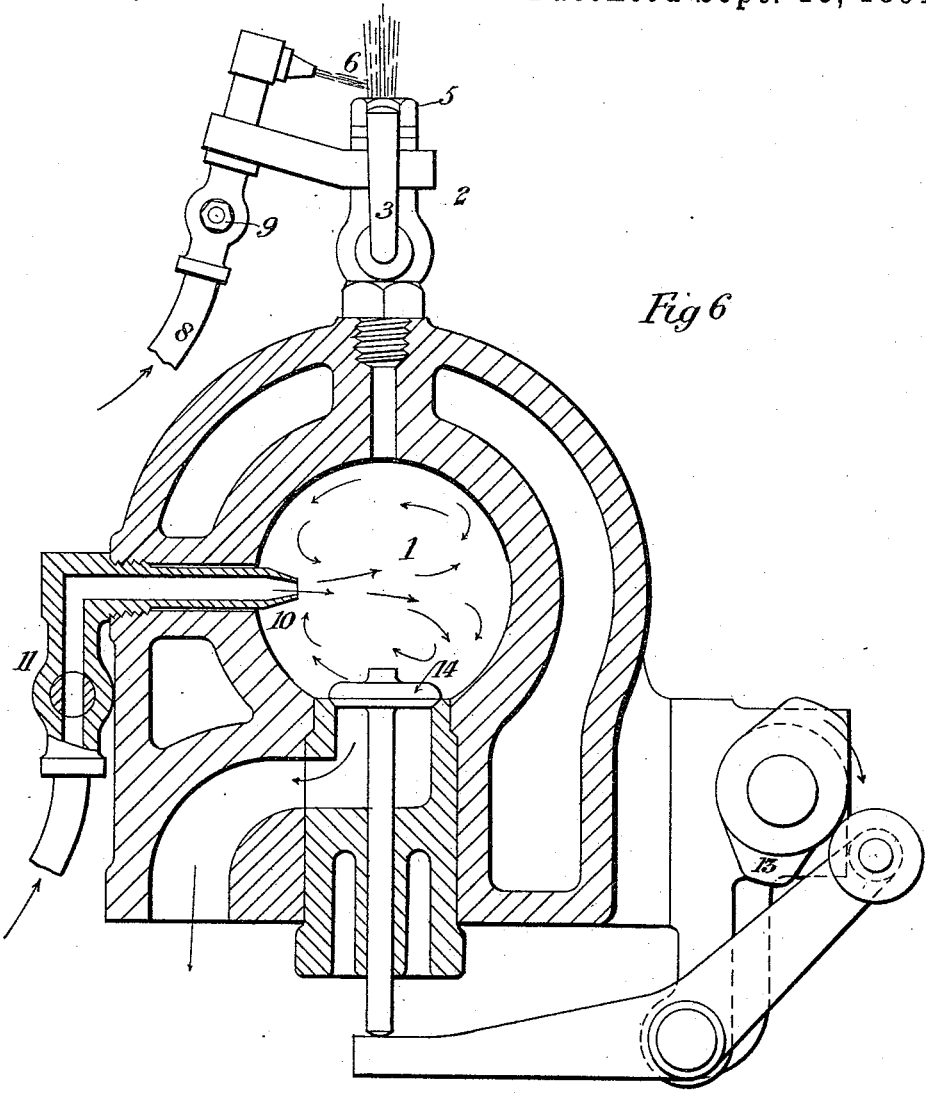

(No Model.) 3 Sheets—Sheet 1.
F. W. LANCHESTER.
GAS ENGINE STARTER.
No. 459,404. Patented Sept. 15, 1891.
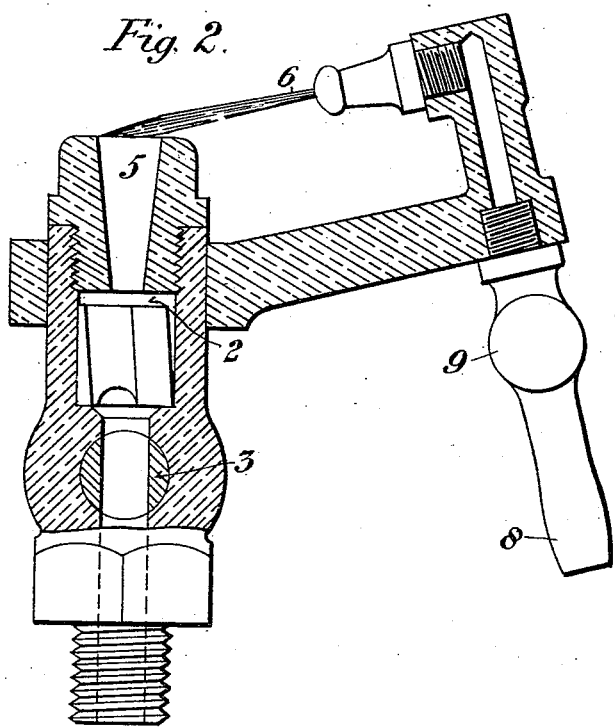
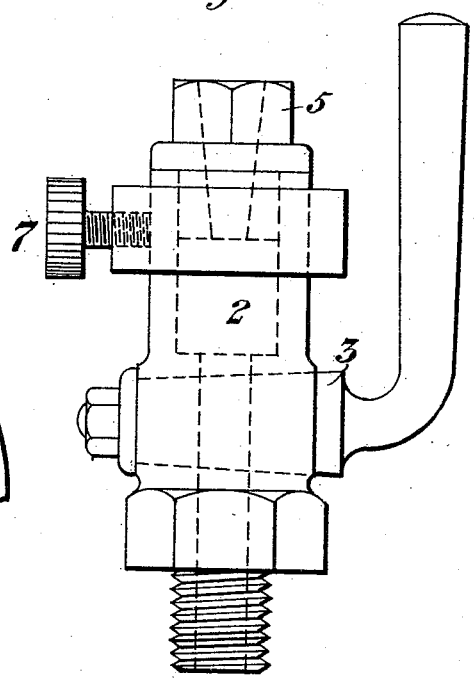
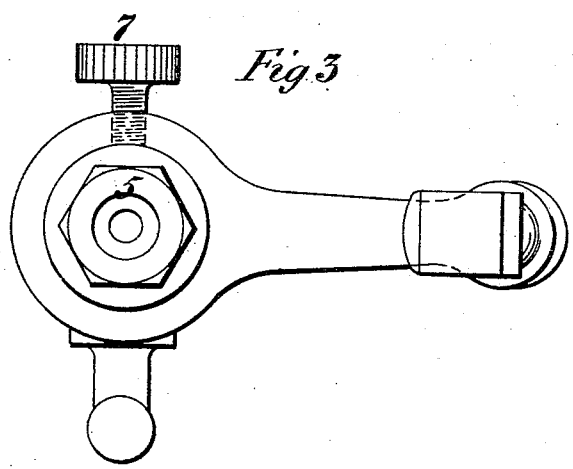
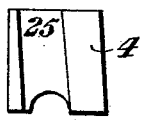
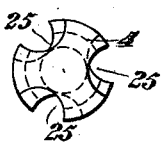
Witnesses
W. H. Chadsey
J. W. Wister
Inventor
F. W. Lanchester
by Herbert W. T. Jenner
Attorney (No Model.) 3 Sheets—Sheet 2.

F. W. LANCHESTER.
GAS ENGINE STARTER.

No. 459,404. Patented Sept. 15, 1891.

Witnesses:
W. H. Chadney
J. H. Pfister

Inventor
F. W. Lanchester
by Herbert W. T. Jenner
Attorney (No Model.) 3 Sheets—Sheet 3.
F. W. LANCHESTER.
GAS ENGINE STARTER.

No. 459,404. Patented Sept. 15, 1891.

UNITED STATES PATENT OFFICE.

FREDERICK WILLIAM LANCHESTER, OF LONDON, ENGLAND.

GAS-ENGINE STARTER.

SPECIFICATION forming part of Letters Patent No. 459,404, dated September 15, 1891.

Original application filed December 19, 1890, Serial No. 375,209. Divided and this application filed May 15, 1891. Serial No. 392,895. (No model.) Patented in England April 10, 1890, No. 5,479; in Belgium November 8, 1890, No. 92,641, and in France November 10, 1890, No. 209,400.

*To all whom it may concern:*

Be it known that I, FREDERICK WILLIAM LANCHESTER, a subject of the Queen of Great Britain and Ireland, residing at 13 Bedford Row, London, in the county of Middlesex, England, have invented certain new and useful Improvements in Gas-Engine Starters, (for which I have obtained patents in England, No. 5,479, dated April 10, 1890; in Belgium, No. 92,641, dated November 8, 1890, and in France, No. 209,400, dated November 10, 1890;) and I do hereby declare the following to be a full, clear, and exact description of the invention, such as will enable others skilled in the art to which it appertains to make and use the same.

This invention for improvements in gas-engine starters relates to engines of that class in which inflammable gas or vapor, together with a certain proportion of atmospheric air, is introduced into the working-cylinder, and then or after compression exploded to increase their pressure to propel the piston during the working stroke, and has for its object to provide improved means for starting the said engines.

This invention consists, substantially, in introducing gas or explosive mixture into the working-cylinder behind the piston while on some part of its working stroke, and in providing means whereby a portion of the contents of the cylinder are allowed to escape through a flame or other ignitor, so that after external ignition takes place on cutting off or reducing the supply of gas or mixture, or otherwise sufficiently diminishing the flow through the ignitor, the ignition passes back to the cylinder and explodes its contents to propel the piston. The gas or explosive mixture for the first explosion is introduced either through a special-supply tap by the ordinary pressure in the gas-supply pipes, or through the ordinary supply-valves, which are opened by hand, and the engine turned in the proper direction by hand to draw in combustible mixture, and then turned slightly back in the reverse direction to force a portion of the said mixture through the ignitor or through a check-valve by means of a hand-pump, the internal ignition taking place as soon as the piston of the hand-pump has completed its stroke. The explosive mixture for the subsequent explosions after the first is introduced in the same manner as when the engine is in ordinary working; but in compression-engines the exhaust-port of the cylinder is kept open until the piston has completed its compressing stroke by means of a relief-cam, which can be readily thrown out of action when the engine has attained sufficient speed to overcome the resistance of compression. The explosive mixture, drawn in as described, is exploded by the ignitor at the commencement of the working stroke as the crank crosses the dead-center.

In a gas-engine of the Otto type provided with a starter constructed according to this invention the compression-chamber is fitted with an attachment communicating with the said chamber and terminating in an expanding-nozzle opening to an external flame. This attachment can be permanently closed by a cock and contains a valve which normally remains open by its own weight, but will automatically close by the sudden generation of pressure in the cylinder. In order to start an engine fitted with this improved device for starting, the engine is placed, or it may have been stopped at its previous working, in such a position that its crank is somewhat over the in-center of the working stroke. The external flame of the starter is lighted and the gas or inflammable vapor is turned onto or forced into the working cylinder through a suitable nozzle or nozzles by the ordinary pressure of the gas or by other suitable means. The gas or vapor first displaces a portion of the air contained in the cylinder, which passes out through the nozzle of the starter, and then a continuously-increasing proportion of gas or vapor passes out with the air until it burns with a characteristic roar in the expanding nozzle, when the auxiliary gas-supply is cut off or reduced and the flame passes back into the cylinder and burns or explodes the charge to increase its pressure to start the engine. The automatic valve in the starter closes immediately on the explosion. The cock of the starter is then turned to put it out of action by cutting off communication with the cylinder and the engine continues to work in the ordinary manner.

A relief-cam which keeps the exhaust-port open during more or less of the compressing stroke (as is frequently used to facilitate hand starting) may be used in compression-engines to enable the impulse given by the initial charge to overcome with certainty the back-pressure of the compression. In another arrangement a relief-cam is arranged to keep the exhaust-port of the cylinder open until the piston has completed its compressing stroke. The engine is started, as described above, and after exhausting the products of the first explosion draws in a fresh charge, a portion of which, on the return or compressing stroke, is forced out through the exhaust-port and through the nozzle of the starter. As soon as the piston pauses on the crank, crossing its center, or commences its working stroke, the explosive mixture ceases to pass through the nozzle of the starter or reduces its rate of passing through, and the flame passes back into the cylinder and explodes the remaining portion of the charge therein. A series of explosions may be obtained in this manner. When the engine has attained a sufficient speed to overcome the resistance of compression, the auxiliary cam and the starter are thrown out of action and the engine works in the ordinary manner.

Figure 8:
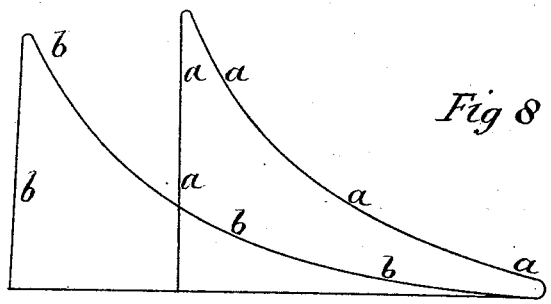
Figure 7:
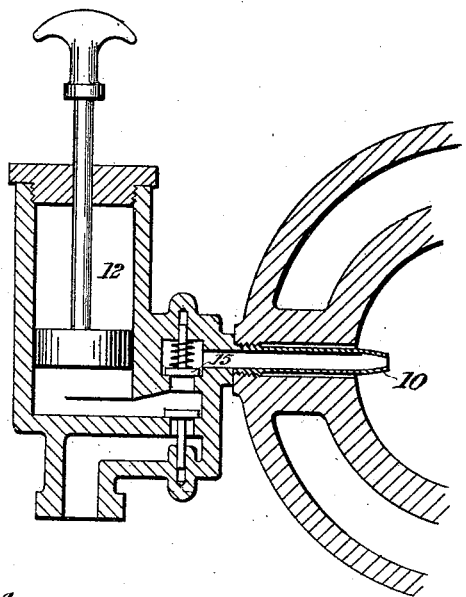
Figure 9:
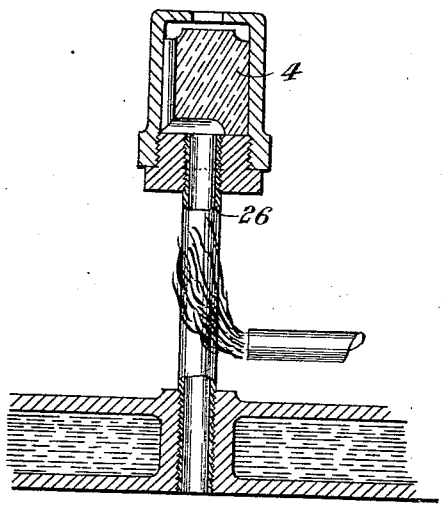
Figure 10:
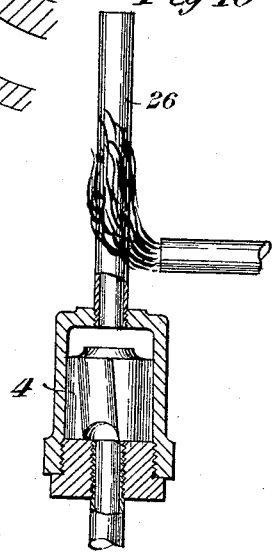

In the accompanying three sheets of drawings, Figure 1 is an elevation of an auxiliary igniting apparatus constructed according to this invention, and hereinafter called the "starter," and Fig. 2 is a vertical section, and Fig. 3 is a plan of the same. Figs. 4 and 5 are detail views, and Fig. 6 is a cross-section, of the cylinder of a gas-engine, showing a complete arrangement for starting fitted in place. Fig. 7 is a similar cross-section showing the application of a pump for introducing the charge of gas or inflammable vapor, which may be arranged to deliver the required volume at a single stroke. Fig. 8 shows the character of the indicator-diagrams produced in starting an engine of the Otto cycle, modified as described above. Figs. 9 and 10 are sections showing suitable arrangements of the starter when the ignition is effected by means of an incandescent tube.

The end of the cylinder or compression chamber 1 is fitted with an attachment consisting of a valve-box 2; of a stop-cock 3, through which communication is made between the cylinder and the valve-box 2; of a valve 4, which normally remains open by its own weight, but is automatically closed by pressure in the engine-cylinder, and of a nozzle 5, which is connected to the valve-box 2 and opens to an external flame 6. The nozzle 5 is preferably conical, expanding toward the direction of discharge. The external flame 6 can be adjusted with reference to the nozzle 5 by means of the thumb-screw 7, and is supplied with gas by means of a tube connected to the nipple 8. A stop-cock 9 serves to regulate or extinguish the flame 6. The compression-chamber 1 is also fitted with a suitable nozzle 10, by means of which gas can be admitted to the cylinder through the supply-cock 11. The gas so admitted may be forced in by the ordinary pressure in the gas-supply pipes, as illustrated in the cross-section Fig. 6, or it may be supplied by means of a hand-pump 12, as shown in Fig. 7.

In order to start an engine fitted with the starter, it is placed, or it may have been stopped at its previous working, in such position that its crank is somewhat over the in-center of the working stroke. The external flame 6 of the starter is lighted and the gas or inflammable vapor is turned on to the working-cylinder through the nozzle 10. The pressure in the gas-pipes causes the gas to flow into the cylinder and displace a portion of the air it contains through the nozzle 5; but the entering jet mixes with the remaining air, as indicated at Fig. 6 by the arrows, and so produces an explosive mixture, part of which, after a time, finds its way through the nozzle 5. The external flame 6 then ignites it and the jet burns at the nozzle 5 through the external flame into the atmosphere, increasing in richness of gas or vapor till explosive mixture is formed. The gas-supply cock 11 is then shut off and the flame passes back into the cylinder and ignites or explodes the charge to increase its pressure to start the engine. The automatic valve 4 in the starter closes immediately on the explosion of the charge, and then the cock 3 is turned to put it out of action, when the engine continues to work in the ordinary manner. The diagram given by this explosion is indicated at Fig. 8 by the lines a a a a, and in some cases, where the friction of the engine is proportionally small, the single impulse so given is sufficient to start the engine even against the compression. An incandescent body or shower of electric sparks, or other convenient means, may be used in lieu of the flame.

Instead of having a separate means of introducing the inflammable vapor for starting the engine, the supply-valves may be opened and the engine turned in the proper direction by hand to draw in combustible mixture, and then slightly turned back in the reverse direction to force a portion of the said mixture through the starter-nozzle, where it is ignited, the flame traveling back and exploding the mixture, as described above, to start the engine.

When a number of low-pressure explosions are required to get up speed, a cam 13 is arranged on the second-motion shaft in such manner that when placed in gear it holds open the exhaust-valve 14 during the whole compression stroke of the engine. This cam 13 is placed in gear before obtaining the first explosion, as hereinbefore described, and when the engine moves under its influence the modified action of the subsequent strokes is as follows: The burned gases resulting from the first explosion are discharged on the next instroke, when the exhaust-valve closes, and on the outstroke a charge of gas and air is drawn into the cylinder. A large proportion of this volume of explosive mixture is discharged on the following instroke, which in ordinary circumstances would be the compression stroke. So long as the exhaust-valve 14 is held open by the special cam 13, the pressure remains near that of the external atmosphere; but enough back-pressure exists to cause the mixture to flow through the starter and burn from the nozzle 5, it being ignited at the external flame 6. When the piston arrives at the in end of the stroke and the exhaust-valve closes, the pressure rapidly falls and the flame passes back to the compression-space at the end of the cylinder and explodes the mixture to give an additional impulse to the engine. A diagram similar to $b\ b\ b\ b$, Fig. 8, is thus produced, and the piston moves forward on its working stroke. So long as the starting-cam 13 is in gear and the starter-cock 3 is open, the engine continues in motion and a low-pressure impulse is given at every second revolution. When the speed has become sufficiently great to allow of the compression, the cock 3 is closed and the starting-cam 13 is put out of gear in any usual manner. The engine then acts by its ordinary igniting arrangement with compression.

Instead of supplying gas direct from the gas-supply pipes by its ordinary pressure, the hand-pump 12 is sometimes used to force in a charge of gas through the check-valve 15 by the nozzle 10 to the cylinder 1. The action is precisely similar to that hereinbefore described, and the explosion occurs when the hand-pump piston has terminated its discharging stroke. The check-valve 15 prevents the effect of the explosion from reaching the gas-pump. The charge of the gas-pump and direction of the jet from the nozzle 10 is so arranged that explosive mixture speedily finds its way to the starter-nozzle 5. In all arrangements ignition passes back immediately the velocity of propagation of the flame exceeds the velocity of the mixture.

The valve 4 may be held open by a spring instead of its own weight and the position may then be varied by placing it at the side or under the cylinder instead of above it. The object of the valve 4 is to prevent undue loss of pressure on the explosion taking place, the grooves 25 being of such area as will not interfere with ignition.

In Figs. 9 and 10 the gases issuing from the cylinder are ignited by an incandescent tube 26, and the flame passes back to the cylinder immediately the flow is sufficiently reduced, and the resulting explosion closes the valve, whether the tube be between it and the cylinder or outside the valve. The issuing gases may be ignited by the electric spark or other means. The relative areas of the nozzles may be such that the flame, instead of being caused to strike back by reduction of the rate of flow, strikes back on the mixture, becoming sufficiently rich. In this latter arrangement an automatic valve, somewhat similar to the valve 4, is placed upon the gas-supply pipes and closes automatically when the explosion occurs.

I do not herein claim my method of starting a gas-engine, as the same is fully described and claimed in application filed December 19, 1890, Serial No. 375,209.

What I claim as my invention, and desire to secure by Letters Patent, is—

1. In a gas-engine starter, the combination, with a stop-cock adapted to be attached to the combustion-chamber and provided with the chamber 2, of the nozzle secured to the end of the said stop-cock beyond the chamber 2, means for igniting the gas issuing from the said nozzle, and a valve in the said chamber, said valve being adapted to close the entrance to the nozzle automatically when the flame has passed through the stop-cock and ignited the contents of the combustion-chamber, substantially as set forth.

2. In a gas-engine starter, the combination, with a valve-casing provided with the chamber 2 and adapted to communicate with the combustion-chamber, of the nozzle 5, means for igniting the gas issuing from the said nozzle, and a valve provided with longitudinal grooves and normally permitting the passage of gas from the combustion-chamber through the nozzle, said valve being adapted to close the entrance to the nozzle automatically when the flame has passed through its grooves and into the combustion-chamber, substantially as set forth.

3. A gas-motor-engine-starting apparatus consisting of a nozzle opening from the cylinder to an external flame or other ignitor, the said nozzle containing a check-valve which remains open except when subjected to a predetermined pressure within the cylinder, and means for keeping the exhaust-port open during the usual compression-stroke, and which can be readily thrown out of action when the engine is running, substantially as described.

In testimony whereof I affix my signature in presence of two witnesses.

FREDERICK WILLIAM LANCHESTER.

Witnesses:
 WALTER J. SKERTEN,
 THOMAS LAKE.